United States Patent
Watanabe

[11] Patent Number: 5,943,309
[45] Date of Patent: Aug. 24, 1999

[54] DISK UNIT HAVING A SLIDE-RESTRICTING MEMBER FOR EASY DISK-EXCHANGING OPERATION

[75] Inventor: Takashi Watanabe, Ichikawa, Japan

[73] Assignee: TEAC Corporation, Tokyo, Japan

[21] Appl. No.: 08/629,618

[22] Filed: Apr. 9, 1996

[30] Foreign Application Priority Data

Jul. 26, 1995 [JP] Japan .................................. 7-190738

[51] Int. Cl.⁶ .................................................. G11B 33/02
[52] U.S. Cl. .......................................... 369/77.1; 369/75.2
[58] Field of Search ................................. 369/77.1, 77.2, 369/75.2; 360/96.5; 361/685, 727; 312/334.46, 9.16, 9.28, 9.29, 9.47, 334.1, 334.8, 334.44

[56] References Cited

U.S. PATENT DOCUMENTS 5,105,414  4/1992  Funabashi et al. ..................... 369/77.1
5,356,207  10/1994  Röck et al. ......................... 312/334.46

FOREIGN PATENT DOCUMENTS 60-147964  8/1985  Japan .
63-204546  8/1988  Japan .
7-235415  9/1995  Japan .

*Primary Examiner*—Stuart S. Levy
*Assistant Examiner*—Kenneth W. Fields
*Attorney, Agent, or Firm*—Michael N. Meller

[57] ABSTRACT

A disk unit includes a tray and a slide-restricting member. The tray conveys a disk between a disk-driving position positioned inside a chassis and a disk-exchanging position positioned outside the chassis. The slide-restricting member is provided between the tray and the chassis in a slidable manner and is engageable with a coupling part formed in at least one of the tray and the chassis to restrict the tray from moving beyond the disk-exchanging position when the tray is extracted and arrives at the disk-exchanging position. Further, the slide-restricting member is movable between a first position positioned in a backward direction from a rear-end part of the tray and a second position positioned in a forward direction from the rear-end part of the tray.

8 Claims, 16 Drawing Sheets

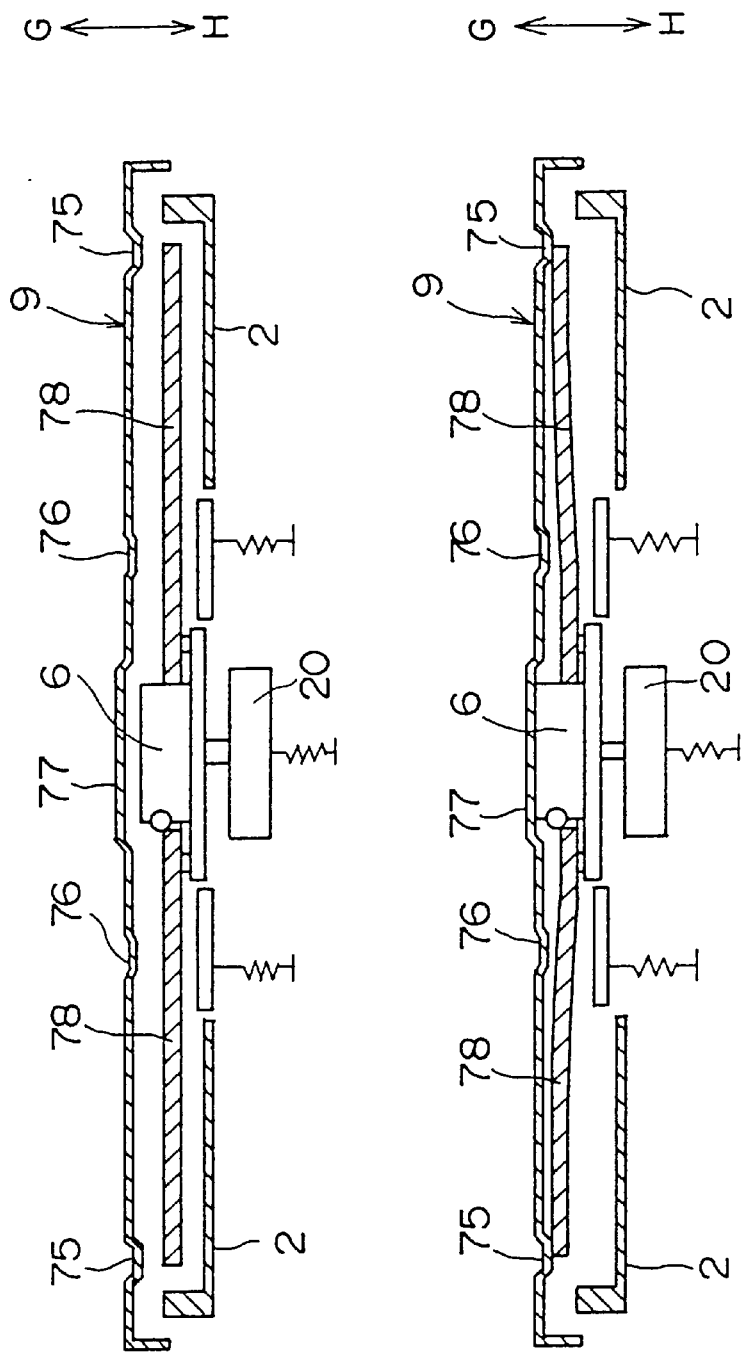

DISK UNIT HAVING A SLIDE-RESTRICTING MEMBER FOR EASY DISK-EXCHANGING OPERATION

BACKGROUND OF THE INVENTION

1. Field of the Invention

The present invention generally relates to a disk unit, and more particularly, to a disk unit included as a CD-ROM driving apparatus in a notebook-type personal computer, etc.

2. Description of the Related Art

For a storage medium storing information such as a data base and software, a compact disk (CD: 12-cm and 8-cm diameters) from which data is read out using a laser-type pick-up is being used. Therefore, to enable the compact disk to be included in a notebook-type personal computer, etc., a built-in disk unit (CD-ROM driving apparatus) which can easily be built in a chassis is being developed.

In a prior-art disk unit, a tray on which a disk is set is driven by a motor. When the tray is moved outside the chassis of the disk unit, the disk is set on a turn table in the tray, and the tray is returned to the chassis by a driving torque of the motor.

Therefore, in the above-discussed method of driving the tray by the motor, the motor driving the tray and a transmission mechanism transmitting the driving torque to the tray are required. Accordingly, it is difficult to miniaturize and reduce thickness of the disk unit, and, thus, the disk unit could not have been included in the notebook-type personal computer.

To resolve the above problem, a disk unit that does not use the above-discussed motor and transmission mechanism has been developed. The disk unit has a mechanism in which the tray is moved to a disk-driving position in the chassis, and is moved to a disk-exchanging position outside the chassis by a manual operation.

FIG. 1 shows a configuration example of the prior-art disk unit without using the motor and the driving-torque transmission mechanism. This drawing shows a disk unit 100 in a condition in which a tray 102 is extracted from a chassis 101 to a disk-exchanging position. The disk unit 100 has a mechanism in which by a manual operation, the tray 102 is extracted to the disk-exchanging position outside the chassis. Therefore, guide-rail mechanisms 103, 104 for extracting the tray 102 from the chassis 101 are provided in the disk unit 100.

The guide-rail mechanisms 103, 104 are constructed with a moving-side rail 105 (shown in one side of the tray 102) provided in both sides of the tray 102, a fixed-side rail 106 (shown in one side of the chassis 101) which is extended in parallel with the moving-side rail 105 and fixed to both side walls 101a of the chassis 101, slide rails 107, 108 which are provided between the moving-side rail 105 and the fixed-side rail 106 and are jointed with the both rails 105, 106 in a slidable form.

When the tray 102 is extracted from the chassis 101, the fixed-side rail 106 slides in an extraction direction along the slide rails 107, 108, and also, the slide rails 107, 108 slide in the extraction direction along the moving-side rail 105.

In this way, in the guide-rail mechanisms 103, 104, the slide rails 107, 108 provided between the fixed-side rail 106 and the moving-side rail 105 are connected with the fixed-side rail 106 and the moving-side rail 105 in the slidable form. Therefore, the moving-side rail 105 may move by a stroke substantially twice the sliding distance of the slide ails 107, 108. Accordingly, as shown in FIG. 1, the tray 102 can extend to be extracted from the chassis 101, and, thus, a disc-exchanging operation in the tray 102 may easily be carried out. In this case, as the extended part of the tray 102, extending from the chassis 101 increases, the disc-exchanging operation in the tray 102 is much easier.

However, in the structure in which the tray 102 is extended from the chassis 101 using the guide-rail mechanisms 103, 104, when the tray 102 is extended to a given disk-exchanging position, to prevent the tray 102 from being further extracted from the given disk-exchanging position, a slide-stopping mechanism needs to be provided.

FIG. 2 shows a prior-art slide-stopping mechanism. The slide-stopping mechanism shown in FIG. 2 is constructed with a slide stopper 109 provided on a bottom face of the chassis 101, and a sliding piece 110 formed in a back-end part of the moving-side rail 105. When the moving-side rail 105 slides in a forward direction (in the right direction of the drawing) with an extracting operation of the tray 102, the sliding piece 110 also slides in the forward direction. When the sliding piece 110 contacts the slide stopper 109, the sliding operation of the tray 102 is restricted.

Therefore, in the prior-art slide-stopping mechanism, since the sliding piece 110 is provided in the back-end part of the moving-side rail 105, the length of the extended part of the tray 102 is determined by a length of the moving-side rail 105. Accordingly, the tray 102 can not be moved to a position in which the disk-exchanging operation may easily be carried out. There is thus a problem in that the disk-exchanging operation may not easily be carried out.

SUMMARY OF THE INVENTION

It is an object of this invention to provide a disk unit in which a disk-exchanging operation may easily be carried out. This permits the disadvantages described above to be eliminated.

The object described above is achieved by a disk unit comprising a tray conveying a disk between a disk-driving position located inside a chassis and a disk-exchanging position located outside the chassis; and a slide-restricting member which is provided between the tray and the chassis in a slidable manner and is engageable with a coupling part formed in at least one of the tray and the chassis to restrict the tray from moving beyond the disk-exchanging position when the tray is extracted and arrives at the disk-exchanging position; wherein the slide-restricting member is movable between a first position positioned in a backward direction from a rear-end part of the tray and a second position positioned in a forward direction from the rear-end part of the tray.

According to the above-mentioned disk unit, the slide-restricting member for restricting the tray from moving beyond the disk-exchanging position is movable between the first position positioned in the backward direction from the rear-end part of the tray and a second position positioned in a forward direction from the rear-end part of the tray.

Therefore, the tray may further be extracted from the chassis by a movable distance of the slide-restricting member. Accordingly, the disk-exchanging position may be set to a position where the tray is extracted farther from the chassis. As a result, a disk-exchanging operation for the tray may easily be carried out.

The object described above is also achieved by the unit mentioned above further comprising a force-applying member applying force to the slide-restricting member toward the first position.

According to the above-mentioned unit, a force-applying member applying the force to the slide-restricting member toward the first position is provided. Therefore, the tray is always pushed in an extracted direction by the force-applying member. Accordingly, the slide-restricting member may be used as a part of an ejecting mechanism which ejects the tray out of the chassis.

Other objects and further features of the present invention will be apparent from the following detailed description when read in conjunction with the accompanying drawings.

BRIEF DESCRIPTION OF THE DRAWINGS

FIG. 18A and FIG. 18B show cross-sectional views for explaining the projection part formed in the cover;

DETAILED DESCRIPTION OF THE PREFERRED EMBODIMENTS

Figure 1:
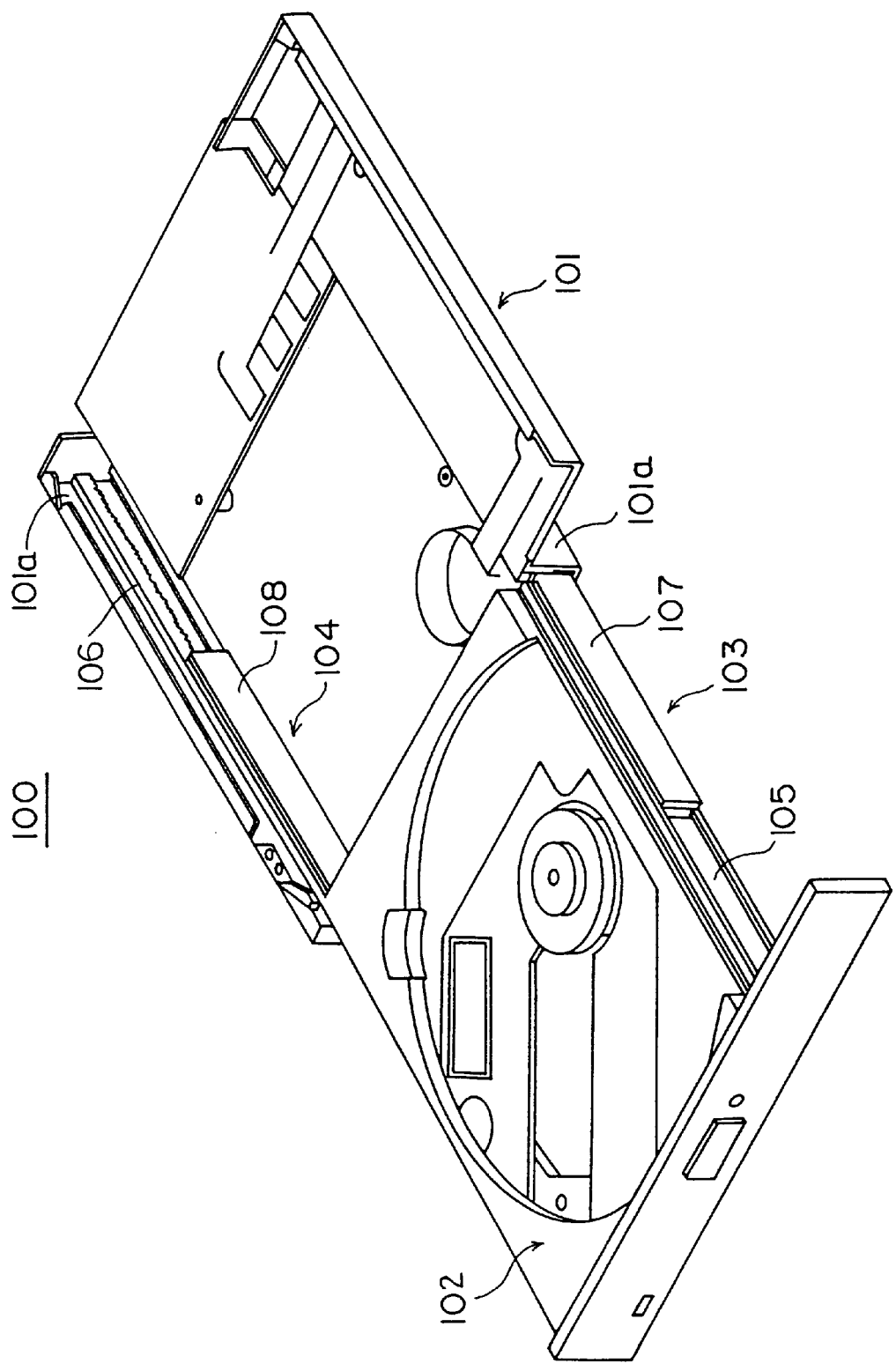
FIG. 1 shows a configuration example of a prior-art disk unit that does not use a motor and a driving-torque transmission mechanism.
Figure 2:
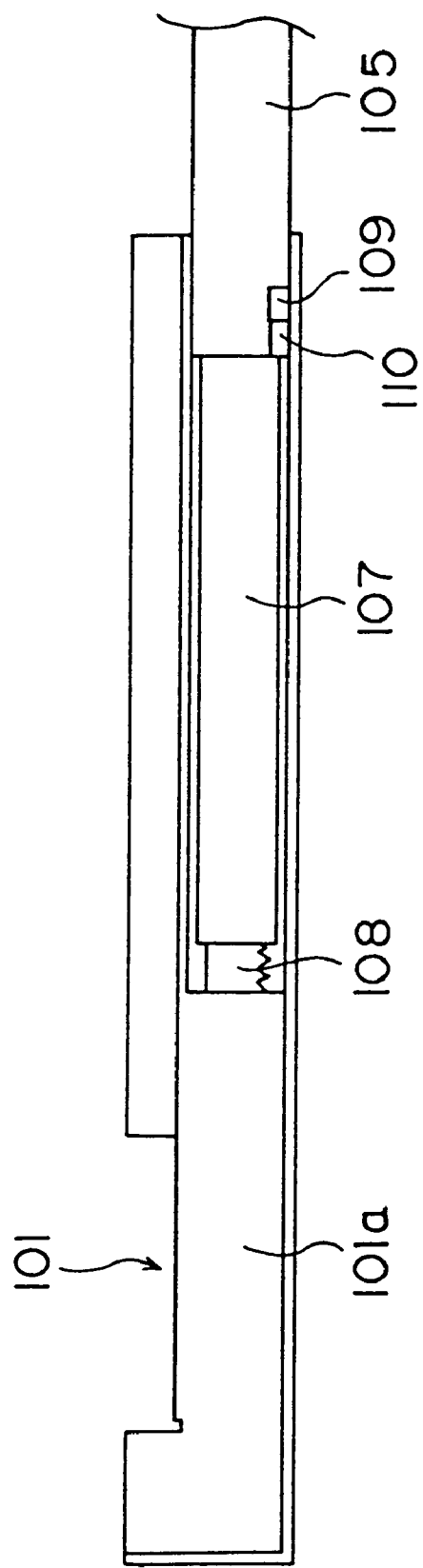
FIG. 2 shows a prior-art slide-stopping mechanism.
Figure 3:
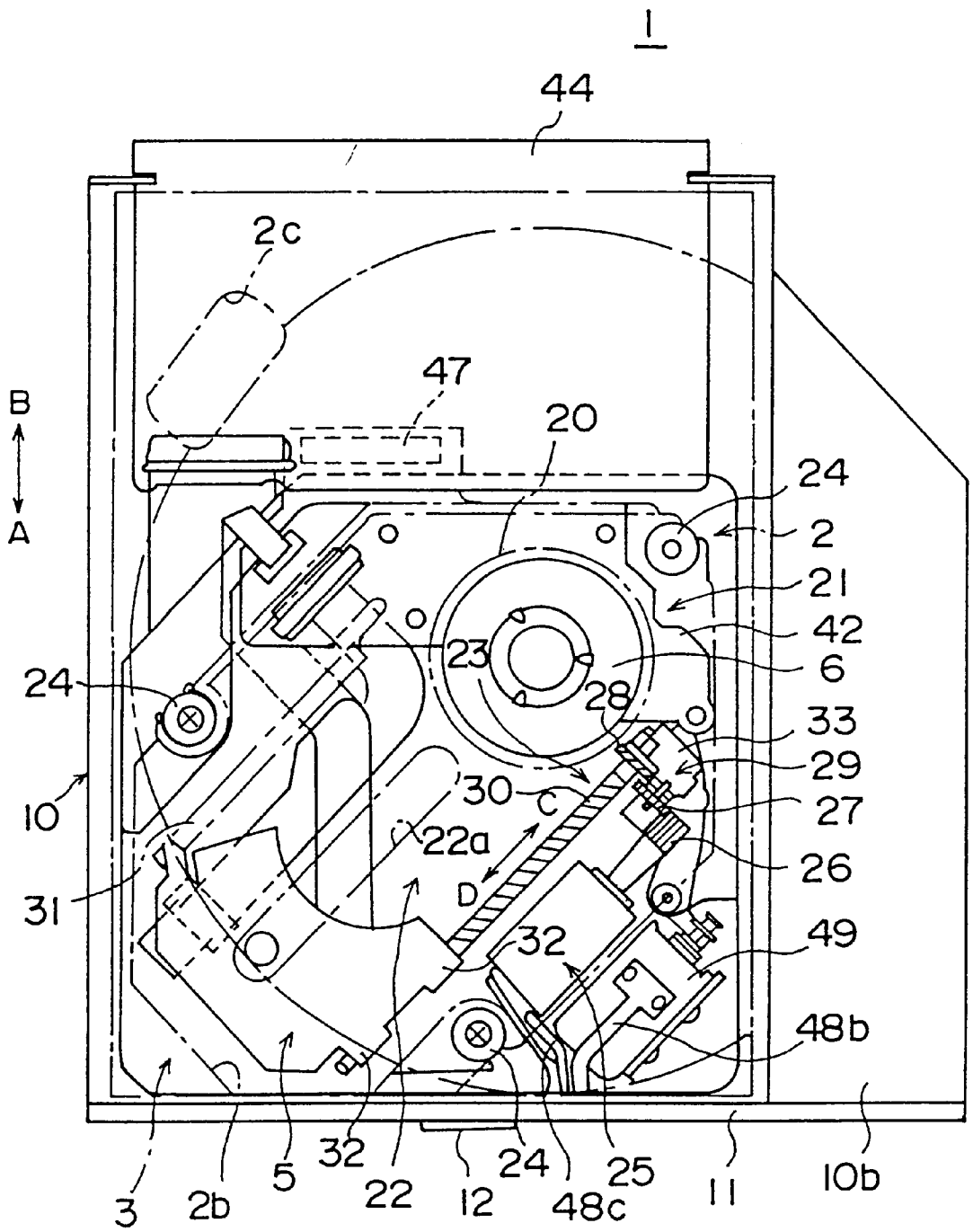
FIG. 3 shows a top-plan view of an embodiment of a disk unit according to the present invention.
Figure 4:
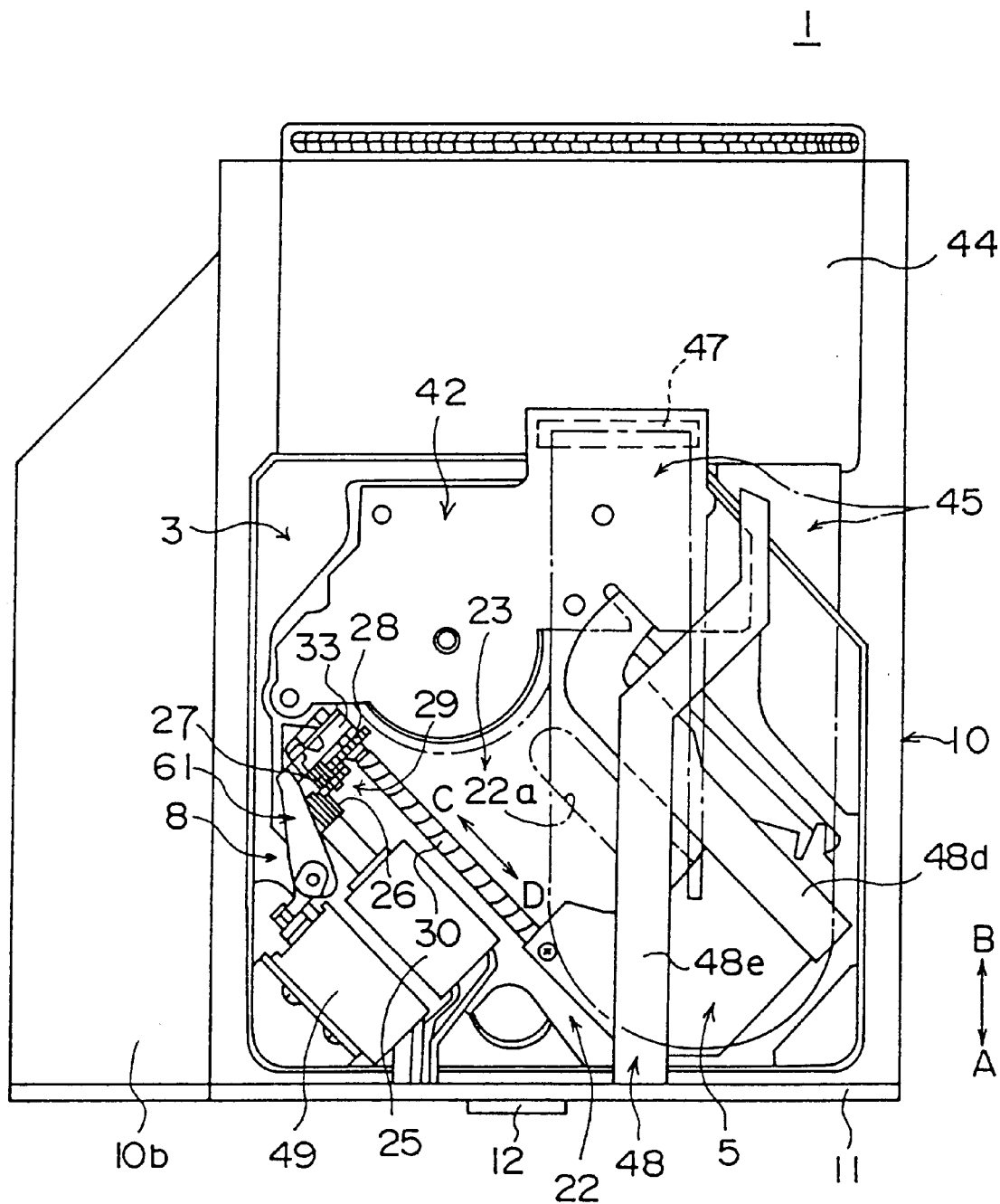
FIG. 4 shows a bottom-view of the embodiment of the disk unit shown in FIG. 3.
Figure 5:
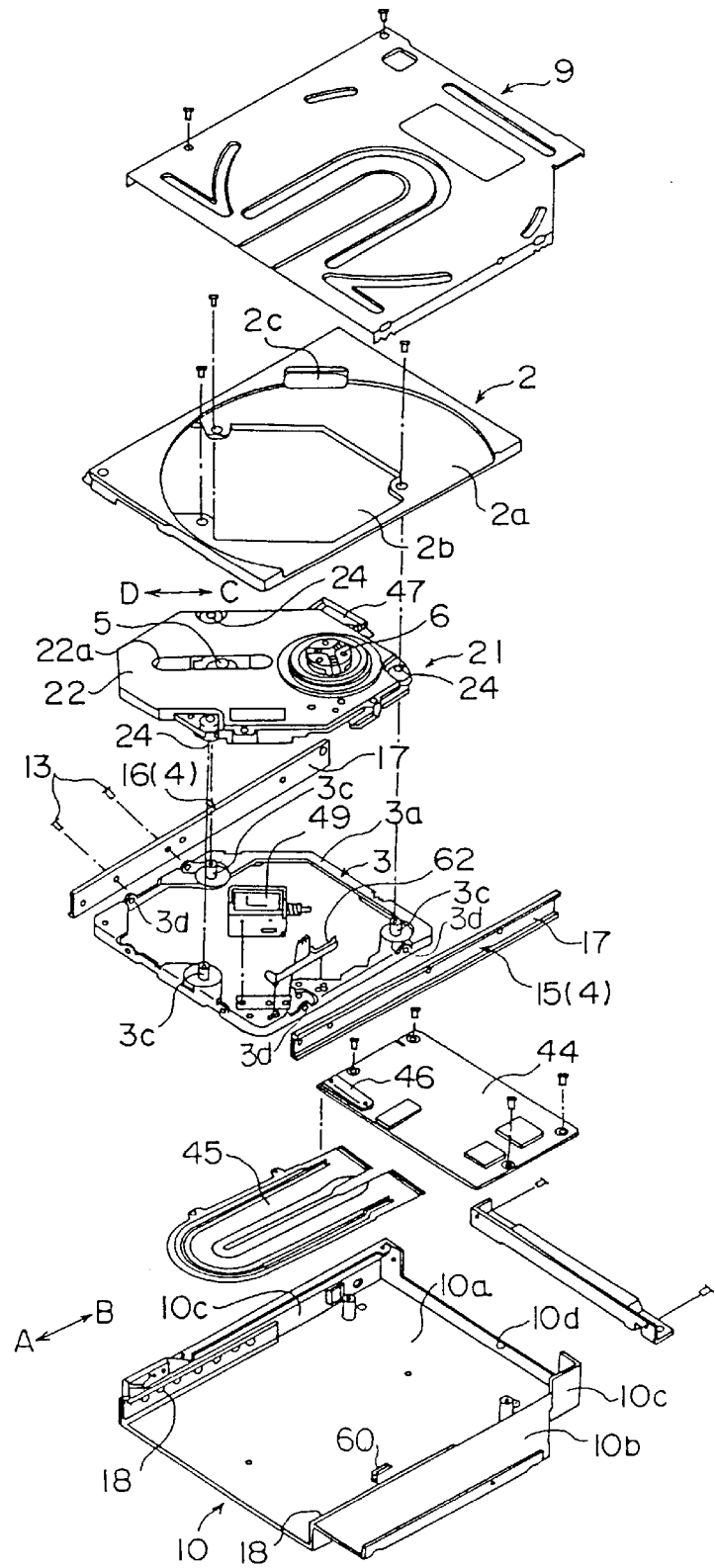
FIG. 5 shows a perspective view of disassembled parts of the embodiment of the disk unit shown in FIG. 3.

First, a description will be given of an embodiment of a disk unit according to the present invention, by referring to FIG. 3 to FIG. 5. FIG. 3 to FIG. 5 show configuration examples of the embodiment of the disk unit according to the present invention. FIG. 3 shows a top-plan view of a disk unit according to the present invention, FIG. 4 shows a bottom-view of the disk unit shown in FIG. 3, and FIG. 5 shows a perspective view of disassembled parts of the disk unit shown in FIG. 3. The disk unit shown in FIG. 3 to FIG. 5 is a built-in CD-ROM driving apparatus 1 (referred to as driving apparatus 1, hereinafter) which may be included in a housing of a note-type personal computer (not shown).

The driving apparatus 1 is mainly constructed with a tray 2 for setting a disk (not shown) thereon, a sub-chassis 3 supporting the tray 2, a tray-sliding mechanism 4 supporting the tray 2 in a slidable form, an optical-type pick-up part 5 provided in the sub-chassis 3, a turntable 6 to rotate the disk (CD-ROM) set on the tray 2, a slide-stopping mechanism 7 (will be shown in FIG. 11 and FIG. 12) stopping the sliding of the tray 2 when the tray 2 moves to the disk-exchanging position, and a locking mechanism 8 locking the tray 2 when the tray 2 moves to the disk-driving position.

FIG. 3 and FIG. 4 show conditions in which a cover 9 shown in FIG. 5 is removed, and the tray 2 (represented by a one-dotted chain line, in FIG. 3) is moved to the given disk-driving position (referred to as the disk-driving position where a reproducing process is carried out in the driving apparatus 1).

The tray 2 is formed so that the diameter of the disk is larger than a width of the tray 2 and a part of the disk (not shown) extends out of the tray 2. The tray 2 is slidable in the directions of arrows A, B shown in the drawings by a manual operation with a later-discussed tray-sliding mechanism 4. As shown in FIG. 3 and FIG. 4, when the tray 2 is set to the disk-driving position, the tray 2 is inserted in the direction of the arrow B. When the tray 2 is set to the disk-exchanging position for exchanging the disk, the tray 2 is extracted or moved in the direction of the arrow A.

As discussed above, the driving apparatus 1 according to the present invention has a structure in which the tray 2 is moved in both directions A and B by a manual operation. Therefore, the number of assembling parts of the driving apparatus 1 according to the present invention may be reduced as compared to the prior-art disc unit having a driving mechanism (constructed with a motor and a driving-torque transmission mechanism, etc.).

In FIG. 3 to FIG. 5, a chassis 10 comprises a housing part 10a housing the above-discussed mechanisms, and a covering part 10b covering a back-side face of the part of the disk extracted from the tray 2 to protect the part of the disk in the outside of the tray 2. Under the covering part 10b, a space is provided, and in the space, other apparatuses may be provided in the note-type personal computer in which the driving apparatus 1 is installed.

A front bezel 11 is fixed to a front end of the tray 2, and, thus, the front bezel 11 may move in the directions A, B with the tray 2. In the center of the front bezel 11, a switch button 12 is provided to release a lock controlled by a later-discussed locking mechanism 8 when extracting the tray 2. Therefore, in the conditions shown in FIG. 3 and FIG. 4, when the switch button 12 is turned on, as later mentioned, the front bezel 11 is extended out of the chassis 10 in the direction A by a given distance. Therefore, the tray 2 may easily be extracted.

The tray 2, as shown in FIG. 5, has a face 2a facing the disk and forming a space which accommodates the disk, an opened part 2b for the pick up and the turntable which is formed in the face 2a facing the disk, and a circular-arc-shape concave part 2c used for inserting a finger of a user to take out the disk set on the face 2a.

The face 2a adjacent the disk is formed so that the width of the face 2a is less than the diameter of the disk so as to cover the housing part 10a of the chassis 10, and the face 2a covers approximately two-thirds of an area of the disk. In the above-discussed structure, the driving apparatus 1 is miniaturized.

Figure 13:
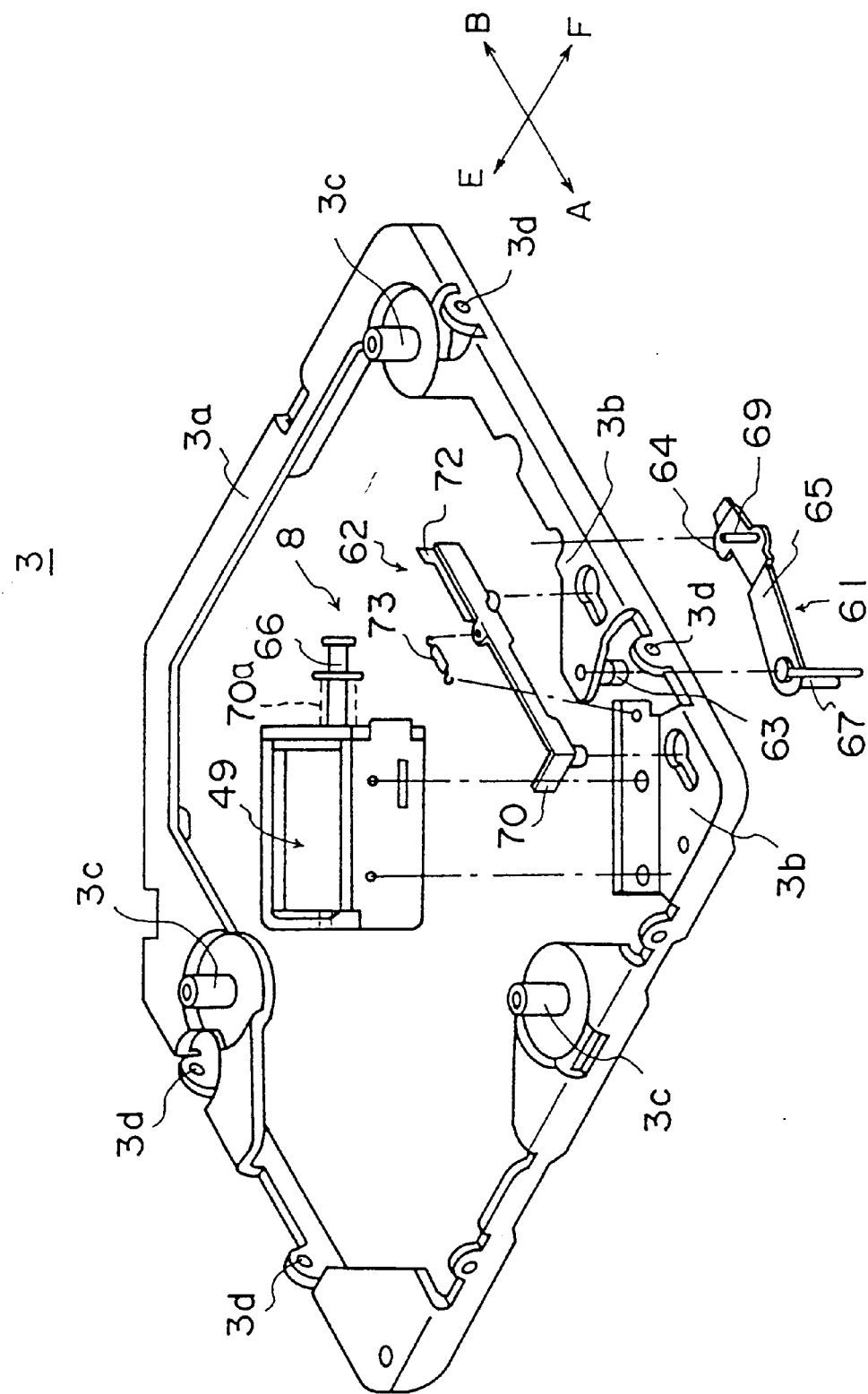
FIG. 13 shows a perspective view of disassembled parts for explaining the sub-chassis and a locking mechanism.
Figure 14:
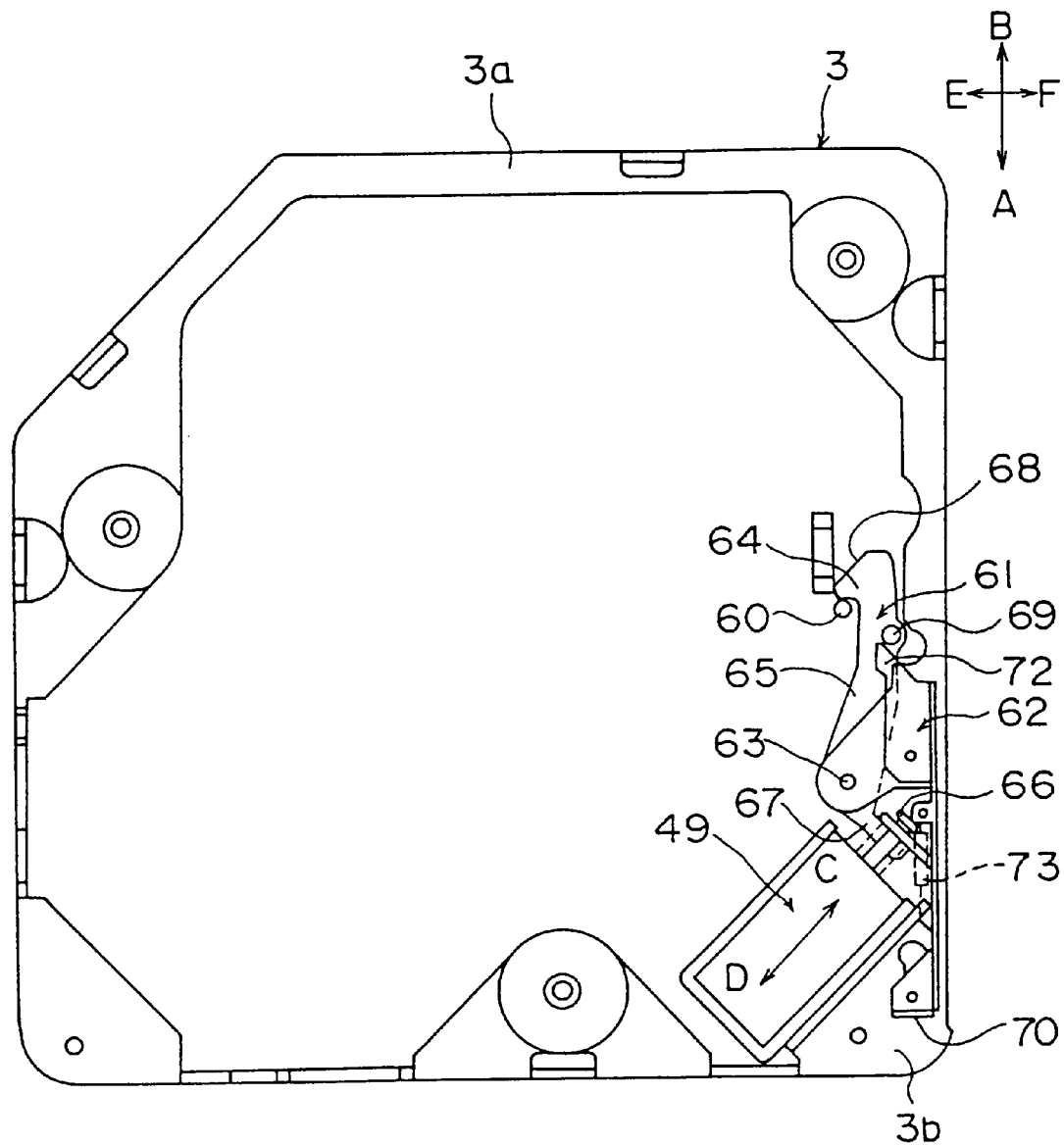
FIG. 14 shows a top plan view for explaining the sub-chassis and the locking mechanism.

The sub-chassis 3, as shown in FIG. 5, FIG. 13 and FIG. 14, is constructed with a square-shape frame 3a having an opened part in which a driving unit 21 having the pick-up part 5 and the turntable 6 is provided, a locking-mechanism installing part 3b in which the later-discussed locking mechanism 8 is provided, bosses 3c for fixing the above-mentioned driving unit 21, and screw holes 3d for fixing the tray-sliding mechanism 4. On the frame 3, the tray 2 is also installed.

The tray-sliding mechanism 4, as shown in FIG. 5, FIG. 6, FIG. 11, and FIG. 12, has a pair of guide-rail mechanisms 15, 16 installed in both sides of the sub-chassis 3 and provided in side walls 10c of the chassis 10. The guide-rail mechanisms 15, 16 are installed in the sub-chassis 3 by screwing screws 13 into the screw holes 3d.

In the following, a description will be given of the guide-rail mechanisms 15, 16. Since the guide-rail mechanisms 15, 16 have the same structure, in the following description, only the guide-rail mechanism 15 will be discussed. The guide-rail mechanism 15 is constructed with a moving-side rail 17 fixed in the bracket 3d of the sub-chassis 3, a fixed-side rail 18 which extends parallel with the movingside rail 17 and is coupled with the side wall of the chassis 10, a slide rail 19 which is provided between the moving-side rail 17 and the fixed-side rail 18 and joined with the two rails 17, 18 in a slidable manner.

Figure 6:
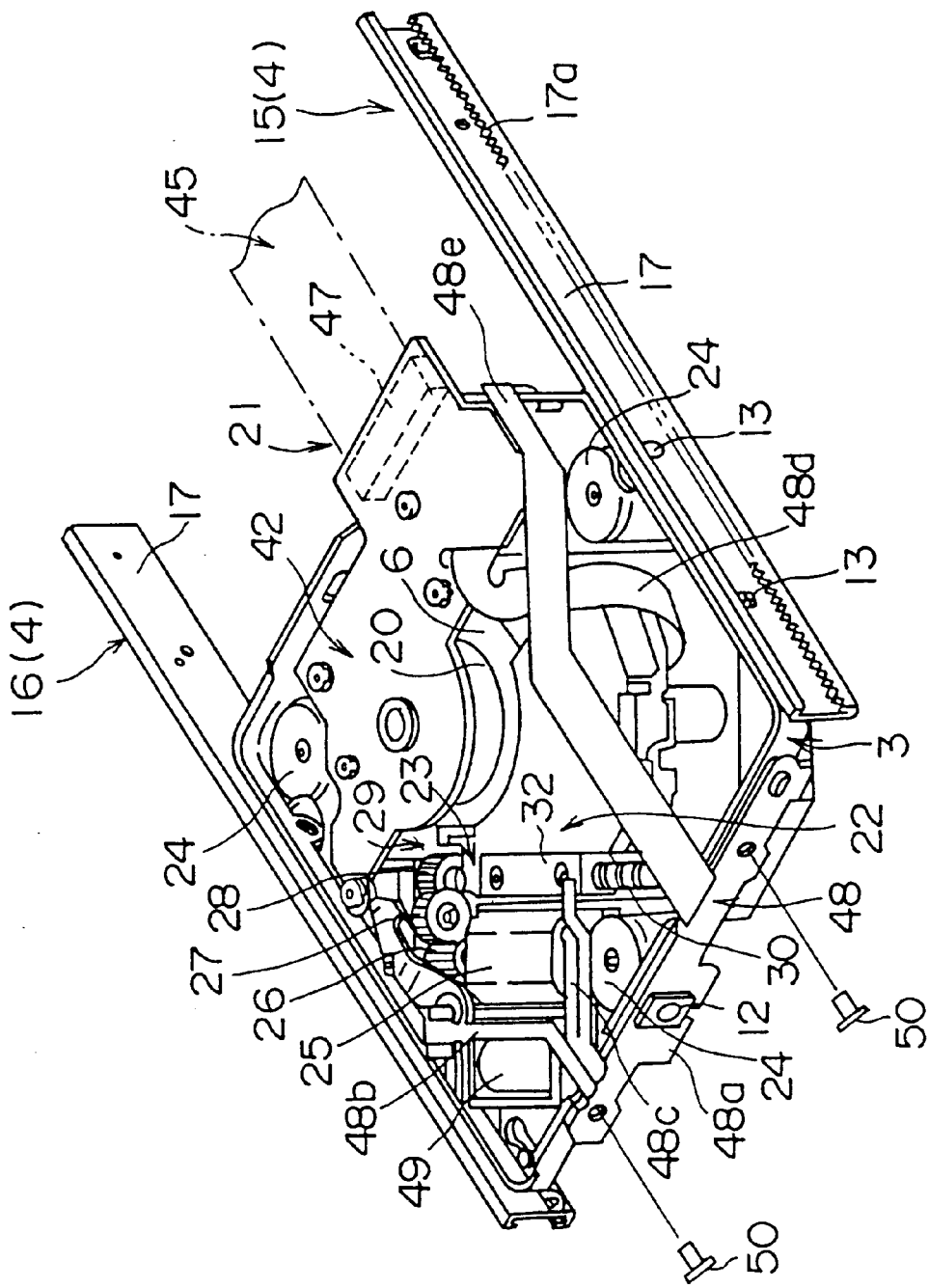
FIG. 6 shows a perspective view for illustrating a bottom side of a sub-chassis in which a driving unit, etc., are installed.

Each of the moving-side rail 17 and the fixed-side rail 18 is formed with a C-shaped cross section. In edge parts of the moving-side rail 17 and the fixed-side rail 18, racks extending in a longitudinal direction (only a rack 17a of the moving-side rail 17 is shown in FIG. 6) are respectively provided. The slide rail 19 is formed with an H-shaped cross section. Further, the moving-side rail 17 and the fixed-side rail 18 respectively couple with the slide rail 19. Also, in a central position of the slide rail 19 in a longitudinal direction, a pinion (not shown) is provided in a rotatable manner, and the pinion and the racks formed in the moving-side rail 17 and the fixed-side rail 18 are in engagement.

Therefore, when the tray 2 is extracted, the 10 fixed-side rail 18 slides on the slide rail 19 in the direction A and rotates a pinion 20. By the pinion 20 being rotated, the slide rail 19 slides on the moving-side rail 17 in the direction A. In this way, in the guide-rail mechanism 15 according to the present embodiment, the slide rail 19 provided between the moving-side rail 17 and the fixed-side rail 18 may flexibly slide on the moving-side rail 17 and the fixed-side rail 18. Therefore, the moving-side rail 17 may move by a stroke approximately twice the moving distance of the slide rail 19.

Figures 12A, 12B, 12C:
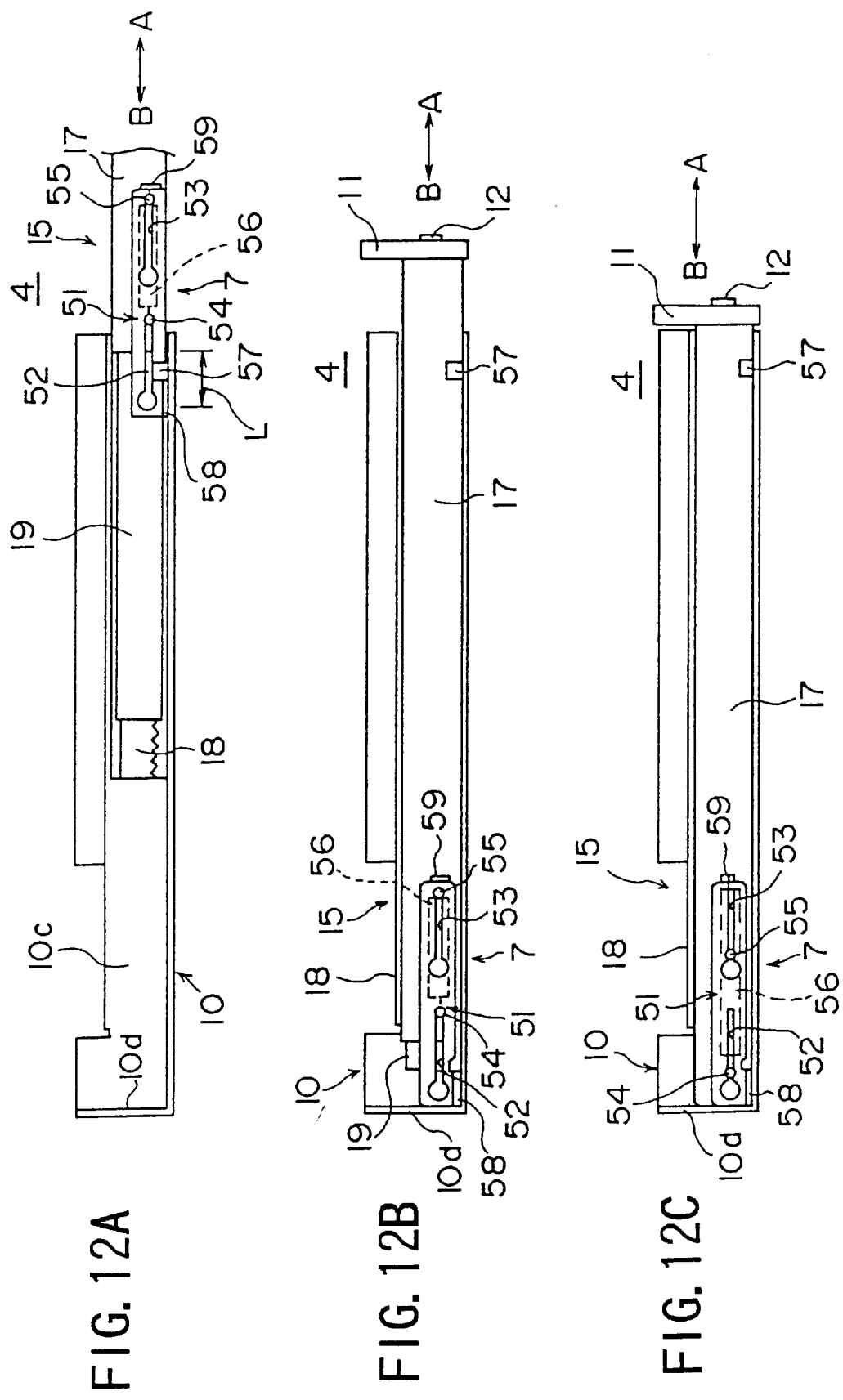
FIG. 12A to FIG. 12C show illustrations for explaining an operation of the slide-stopping mechanism.

In this way, the length which the guide-rail mechanism 15 (16) guides the tray 2 may increase, and the tray 2 may positively be extracted from the disk-driving position within the chassis 10 to the disk-exchanging position outside of the chassis 10. Also, when the tray 2 is at the disk-driving position, each rail 17 to 19 is accommodated in the chassis 10 as shown in FIG. 12C.

When the tray 2 is extracted in the direction A, and when the tray 2 arrives at the disk-exchanging position, the tray 2 needs to be prevented from moving beyond this position. Therefore, the driving apparatus 1 is provided with a slide-stopping mechanism 7 preventing the tray 2 from being extracted beyond the disk-exchanging position. To simplify the description, the slide-stopping mechanism 7 will be discussed later.

Next, a description will be given of the driving unit 21 provided with the pick-up part 5 and turntable 6, by referring to FIG. 3 to FIG. 7. As discussed above, the driving unit 21 is provided over the sub-chassis 3. The driving unit 21 is constructed with the turntable 6, a base 22 installed on the sub-chassis 3, the pick-up part 5 installed in the base 22 in a movable manner, a pick-up driving part 23 moving the pick-up part 5 in a radial direction under the disk, and a disk motor 20 rotating the turntable 6.

The above-mentioned tray 2 is installed on the base 22 of the driving unit 21. In this case, a vibration-proof material 25 absorbing vibration is provided between the sub-chassis 3 and the base 22. Therefore, since the vibration occurring in the pick-up part 5 and the turntable 6 which are installed in the base 22 is absorbed by the vibration-proof material 24, when the tray 2 slides, vibration may be decreased.

The base 22 is made of a resin including glass fibers, and, thus, the base 22 may have a thermal expansion coefficient near that of the pick-up part 5 and the turntable 6. In this structure, even if the thermal environment varies, the distance between the base 22 and each of the pick-up part 5 and the turntable 6 may be maintained with high precision.

The pick-up driving part 23 has a function of moving the pick-up part 5 in directions represented by arrows C, D shown in the drawings. The pick-up driving part 23 is constructed with a pick-up driving motor 25 which is provided on a back-side face of the base 22 and is provided with a gear 26 positioned in a driving axis, a pick-up driving mechanism 29 provided with gears 27, 28, a lead screw 30 driven by the pick-up driving mechanism 29, and a guide part 31 which extends in parallel to the lead screw 30 and guides the moving of the pick-up part 5. The pick-up driving part 23 is constructed as an integral body.

The pick-up part 5 has a coupling part 32 for relationally coupling with a screw part of the lead screw 30. Therefore, when the pick-up driving motor 25 rotates, the lead screw 30 is driven to rotate by the pick-up driving mechanism 29, and the pick-up part 5 moves in the radial direction of the disk (directions C, D). Further, in the base 22, a longitudinal hole 22a is formed along a moving direction of the pick-up part 5. Therefore, the pick-up part 5 may always face the disk over the moving range of the pick-up part 5.

Next, a further detailed description will be given of the pick-up driving mechanism 29, by referring to FIG. 8 to FIG. 10C. As discussed above, the pick-up driving mechanism 29 has the gears 27, 28. Each of the gears 27, 28 is installed in a rotatable manner in a plastic installation holder 33. In further detail, the gear 27 is supported in a rotatable manner by a supporting axis 34 which is press fit in the installation holder 33, and an E ring 35 is provided to prevent the gear 27 separating from the supporting axis 34.

The gear 28 is installed in an axial-end part of the lead screw 30 as a one body. The axial-end part is inserted into a bearing hole 36 formed in the installation holder 33, and is supported thereby. Further, in a back side of the installation holder 33, namely, in an opposite face from where the supporting axis 34 is provided, a plate spring 37 is provided. The plate spring 37 presses the axial-end part of the lead screw 30 which projects from the bearing hole 36. Therefore, the lead screw 30 is pressed in the direction D.

On the other hand, in the base 22, a bearing part 38 is formed to support an end part in the direction D of the lead screw 30. Therefore, since the lead screw 30 is pressed toward the bearing part 38 by the plate spring 37 to be supported, the lead screw 30 may be positioned with high precision. Accordingly, the pick-up part 5 may be positioned with high precision.

Figure 9:
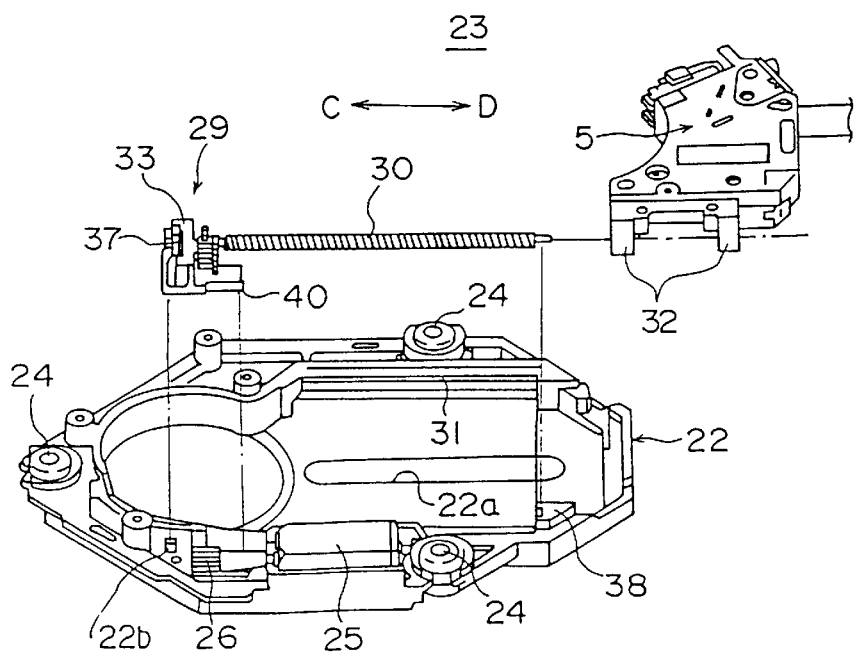
FIG. 9 shows a perspective view of disassembled parts for explaining an installation of the pick-up driving mechanism to a base.
Figure 10A:
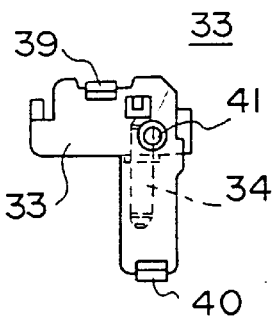
FIG. 10A to FIG. 10C show illustrations for explaining an installation holder.
Figure 10B:
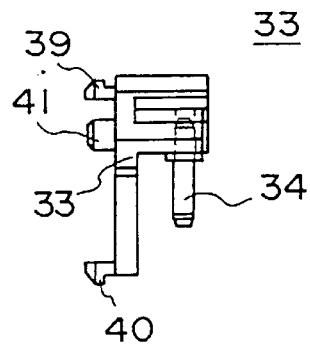
Figure 10C:
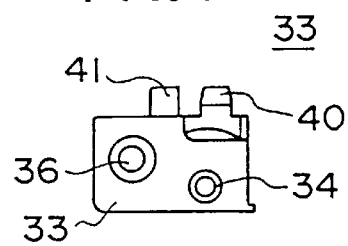

In the installation holder 33, coupling pawls 39, 40, and a rib 41 are formed corresponding to three installation holes 22b (only one is shown in FIG. 9) formed in the base 22. By the relationally-coupling pawls 39, 40 and the rib 41 relationally coupling with the installation hole 22b, the installation holder 33 is fixed to the base 22.

In the above-discussed pick-up driving mechanism 29, the installation holder 33 is individually formed against the base 22. As discussed above, the base 22 is made from a resin including the glass fibers to obtain substantially the same thermal expansion coefficient as that of the pick-up part 5 and the turntable 6. On the contrary, since the installation holder 33 is individually formed against the base 22, the same resin needs to be used for the installation holder 33. Therefore, in this embodiment, the installation holder 33 is formed by a resin which does not include glass fibers.

Although the resin including the glass fibers may have a small thermal expansion coefficient, hardness of the resin increases and it becomes more fragile. Therefore, in a structure in which a holder part for supporting the supporting axis 34 is formed in the installation holder 33, the holder part may break when the supporting axis 34 is pressed and provided in the installation holder 33.

On the contrary, in this embodiment, since the installation holder 33 in which the supporting axis 34 is pressed and provided is individually formed against the base 22, the installation holder 33 may be made of a different material from the base 22. Therefore, as discussed above, in this embodiment, the installation holder 33 is made of a resin which does not include glass fibers. Such resin has higher flexibility as compared to the resin including the glass fibers, when the supporting axis 34 is pressed and provided in the installation holder 33, the installation holder 33 is prevented from being broken.

In this way, since the installation holder 33 and the base 22, respectively, have individual characteristics, the supporting axis 34 may easily be pressed and provided in the installation holder 33. Accordingly, a manufacturing yield of the driving apparatus 1 may be improved. Further, as compared to a structure in which the pick-up driving mechanism and the base are formed as one body, the gears 27, 28, the lead screw 30, etc., may easily be installed in the installation holder 33, and, thus, installing operations may also be improved.

Next, a description will be given of the turntable 6. The turntable 6 is directly connected to the driving axis of the disk motor 20 provided under the turntable 6. When the tray 2 slides and arrives at the disk-driving position in the driving apparatus 1, the disk motor 20 drives and rotates the disk on the turntable 6.

Figure 7:
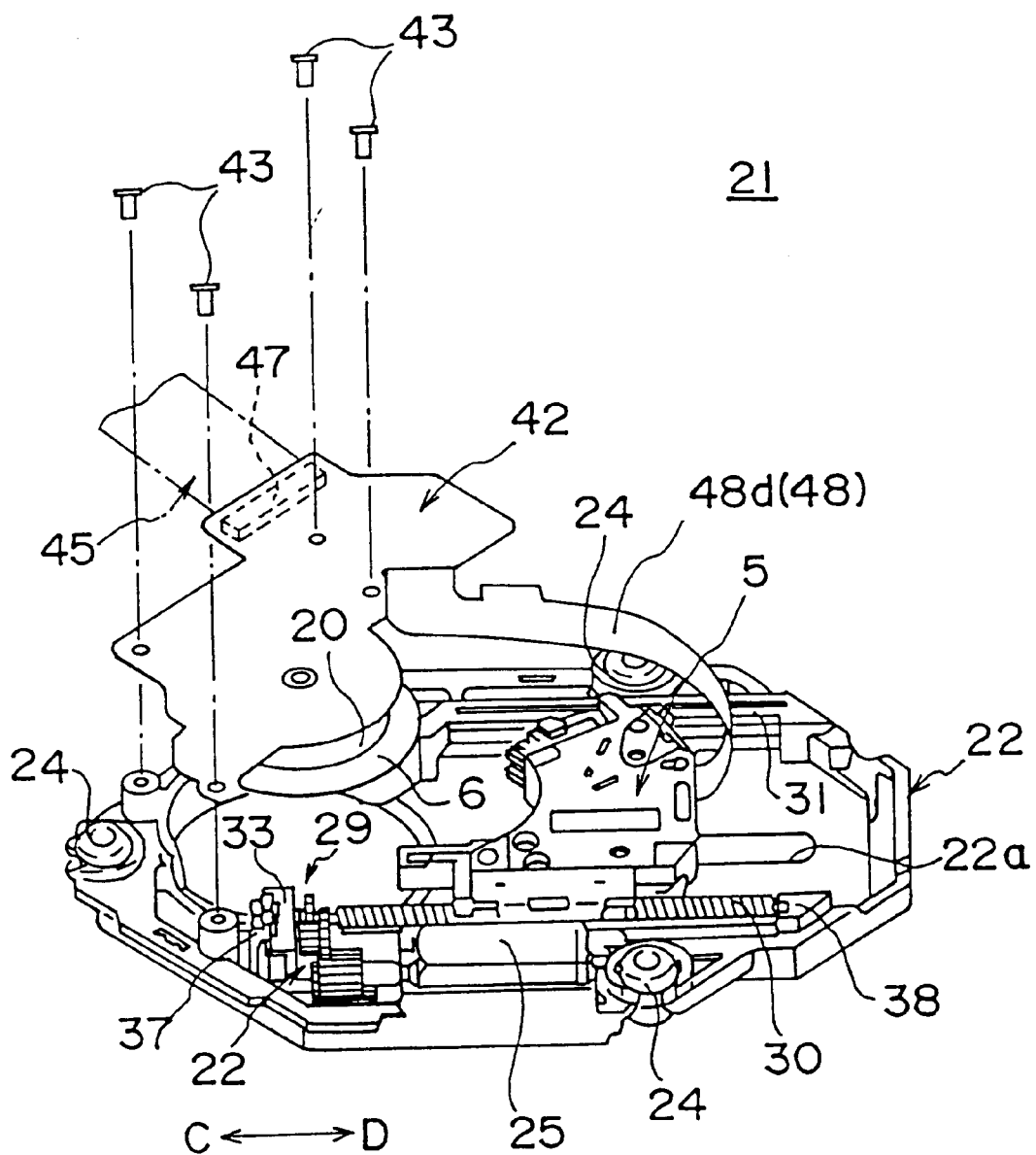
FIG. 7 shows a perspective view for illustrating a bottom side of the driving unit.
Figure 8:
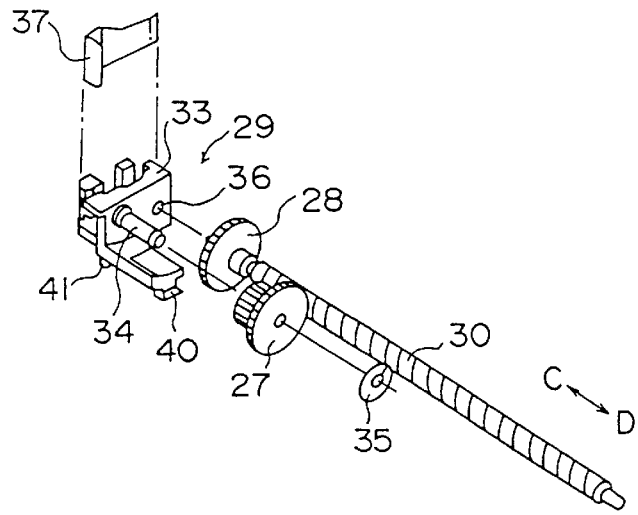
FIG. 8 shows a perspective view for illustrating a pick-up driving mechanism.

As shown in FIG. 4, FIG. 6, and FIG. 7, the disk motor 20 is fixed to a motor-base member 42. By fixing the motor-base member 42 to the base 22 using screws 43 as shown in FIG. 7, the turntable 6 formed with the disk motor 20 as one body is installed in the base 22.

In the following, the electrical wiring of the driving unit 21 will be discussed. As discussed above, in the driving unit 21, electrical parts such as the pick-up part 5, the disk motor 20, and the pick-up driving motor 25 are provided. These electrical parts 5, 20, 25 need to be connected to a circuit board 44 provided in the chassis 10. In the circuit board 44, a signal processing circuit processing a reproduced signal generated in the pick-up part 5, and a control circuit controlling the motors 10, 25 are provided.

Since the driving unit 21 is structured so as to be movable in the directions A, B, the driving unit 21 is connected with the circuit board 44 by using a flexible board 45. An end part in the circuit-board side of the flexible board 45 is connected to a connector 46 provided in the circuit board 44. Further, in this embodiment, as shown in FIG. 6 and FIG. 7, an end part in the driving-board side of the flexible board 45 is connected to a connector 47 (terminal part) provided in the motor-base member 42.

In the prior art, the end part in the driving-unit side of the flexible board 45 was connected to a connector provided in a printed board which was further provided on a bottom face of the driving unit. Also, the electrical parts were connected with the connector by using wiring patterns formed in the printed board.

On the contrary, in this embodiment, as discussed above, the connector 47 connected to the flexible board 45 is provided in the motor-base member 42. The motor-base member 42 has previously been used as a component for fixing or securing the disk motor. In this embodiment, the motor-base member 42 is used as a component for providing the connector 47.

In the above-discussed structure, the motor-base member 42 may have the same function as that the conventional printed board has. Therefore, the printed board required in the prior-art disk unit is unnecessary. Accordingly, the driving unit 21 may be thinner, and, thus, the driving apparatus 1 may be thinner. Further, since the printed board which is required in the prior-art disk unit is unnecessary in this embodiment, the number of parts of the disk unit may be reduced, and, thus, production cost of the disk unit may also be reduced.

In this embodiment, since no printed board is provided as discussed above, a problem of how the connector 47 is connected with the electrical parts 5, 20, 25 needs to be solved. In the embodiment, by using a flexible board 48 (referred to as a unit-interconnection FPC (flexible printed cable) 48), the connector 47 is connected with the electrical parts 5, 20, 25.

As shown in FIG. 6, the unit-interconnection FPC 48 is constructed with a base part 48a fixed to a front-side face of the chassis 10 by screws 50, a first extending part 48b extending toward a solenoid 49 constituting the later-discussed locking mechanism 8, a second extending part 48c extending from the base part 48a toward the pick-up driving motor 25, a third extending part 48d extending toward the pick-up part 5, and a fourth extending part 48e connecting the base part 48a and the connector 47. An electrical connection between the disk motor 20 and the connector 47 is carried out using printed wires formed in the motor-base member 42.

In this embodiment, for the connection between the electrical parts 5, 20, 25 and the connector 47, the unit-interconnection FPC 48 is used. However, instead of the unit-interconnection FPC 48, leading wires or jumpering wires are also applicable.

Figure 11:
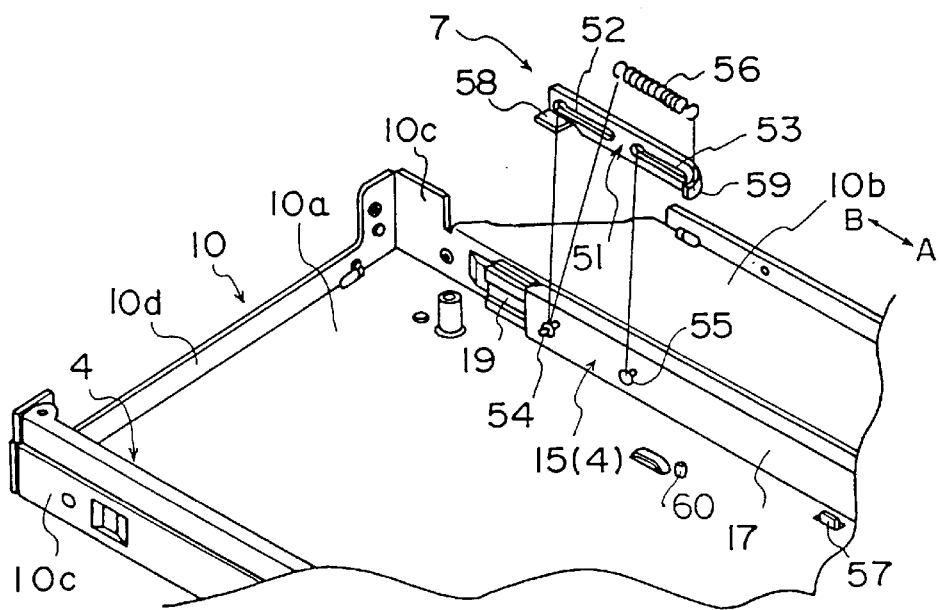
FIG. 11 shows an perspective view for explaining a tray-sliding mechanism and a slide-stopping mechanism.

Next, a description will be given of the slide-stopping mechanism 7, by referring to FIG. 11 to FIG. 12C. As discussed above, the slide-stopping mechanism 7 is the mechanism for preventing the tray 2 from moving farther when the tray 2 arrives at the disk-exchanging position. The slide-stopping mechanism 7 is constructed to include a slide-stopping lever 51 (position-restriction member) provided in an end part in the direction B of the moving-side rail 17 of the tray 2, coupling pins 54, 55 which are on the moving-side rail 17 and are relationally coupled with two longitudinal holes 52, 53 formed in the slide-stopping lever 51, a coil spring 56 pressing the slide-stopping lever 51 in the direction B, and a coupling projection 57 provided adjacent to an end part in the direction A of the chassis 10.

By the longitudinal holes 52, 53 relationally coupling with the coupling pins 54, 55, the slide-stopping lever 51 is movable in the directions A and B in the range of the longitudinal holes 52, 53 on the moving-side rail 17. When the slide-stopping lever 51 moves in the direction A, the slide-stopping lever 51 moves to a first position so as to be projected from the back end of the tray 2 (by a distance L shown in FIG. 12A), and when the slide-stopping lever 51 moves in the direction B, the slide-stopping lever 51 moves to a second position inside the tray 2.

Under the end part in the direction B of the slide-stopping lever 51, a coupling pawl 58 relationally coupling with the coupling projection 57 formed in the chassis 10 is provided. Also, in the end part in the direction A of the slide-stopping lever 51, a connection piece 59 connecting with one end of the coil spring 56 is formed. The other end of the coil spring 56 is connected with the coupling pin 54.

Next, a description will be given of an operation of the slide-stopping mechanism 7, by referring to FIG. 12A to FIG. 12C. FIG. 12A shows a condition where the tray 2 is extracted to the disk-exchanging position. In this condition, the coupling pawl 58 formed in the slide-stopping lever 51 engages on the coupling projection 57 formed in the chassis 10 and the tray 2 is restricted from moving in the direction A. Further, when the tray 2 is extracted to the disk-exchanging position, the slide-stopping lever 51 moves in the direction B, and, thus, slide-stopping lever 51 is projected from the back-end part of the moving-side rail 17 (is equal to the back-end part of the tray 2).

By providing the slide-stopping lever 51 as shown in this embodiment, the tray 2 may be further moved in the direction A by a distance equal to that for which the slide-stopping lever 51 is movable on the moving-side rail 17. Namely, if the slide-stopping lever 51 is not provided, the coupling pawl 58 for relationally coupling with the coupling projection 57 formed in the chassis 10 needs to be formed in the back-end part of the moving-side rail 17.

However, in the structure in which the coupling pawl 58 is provided in the back-end part of the moving-side rail 17, an extractable distance of the tray 2 decreases by a distance L shown in FIG. 12A. Therefore, a disk-exchanging operation for the tray 2 may be complicated (for example, the disk needs to be inclined to be set or taken to/from the tray 2).

On the contrary, in this embodiment, the extractable distance of the tray 2 in the direction A may be increased by providing the slide-stopping lever 51. Therefore, the disk-exchanging operation for the tray 2 may easily be carried out.

FIG. 12B shows a condition in which the tray 2 is pressed and moved in the direction B, and the end part in the direction B of the slide-stopping lever 51 contacts the back-end part 10d of the chassis 10. When the tray 2 is further pressed and moved in the direction B as compared to the above condition, the slide-stopping lever 51 is relatively moved in the direction A against the moving-side rail 17 by a spring force of the coil spring 56. This condition is shown in FIG. 12C. In the condition shown in FIG. 12C, the tray 2 is at the disk-driving position, and the tray 2 is locked at the disk-driving position by a later-discussed locking mechanism 8.

On the other hand, when the lock of the locking mechanism 8 is released by operating the locking mechanism 8, and when the tray 2 is in a movable condition, the slide-stopping lever 51 is pressed and moved in the direction B against the moving-side rail 17 by the spring force of the coil spring 56. In this operation, the tray 2 moves in the direction A, and the tray 2, again, is in the condition shown in FIG. 12B, namely, an ejected condition in that the tray 2 is projected from a front face of the chassis 10 by a short distance. Therefore, an operator of the driving apparatus 1 can extract the tray 2 by pulling the projected part of the tray 2 from the chassis 10.

As will be appreciated from the foregoing description, the slide-stopping mechanism 7 has the function of restricting further movement of the tray 2 when the tray 2 moves and arrives at the disk-exchanging position. In addition to this function, the slide-stopping mechanism 7 also has an ejecting function when the lock is released. Therefore, it is unnecessary to provide a dedicated ejecting mechanism in addition to the slide-stopping mechanism 7. As a result, the number of parts of the driving apparatus 1 may be reduced, and, thus, the driving apparatus 1 may be miniaturized.

Figure 19A:
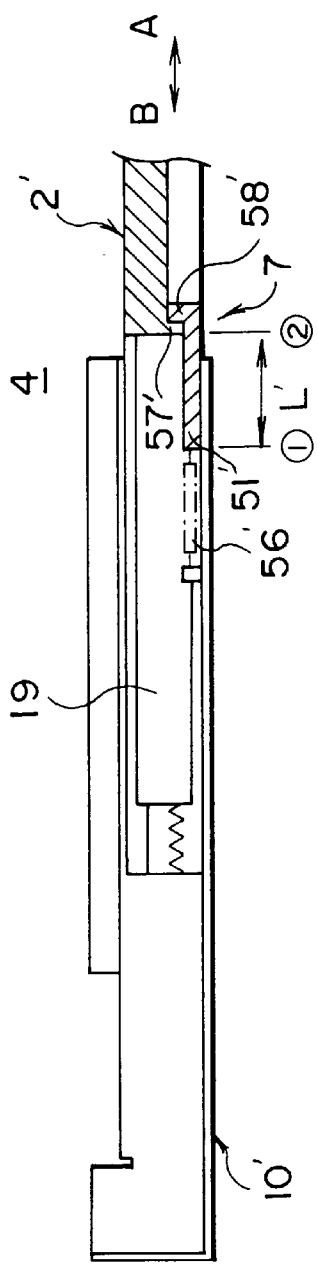
FIG. 19A to FIG. 19C show illustrations for explaining an operation of another embodiment of the slide-stopping mechanism.
Figure 19B:
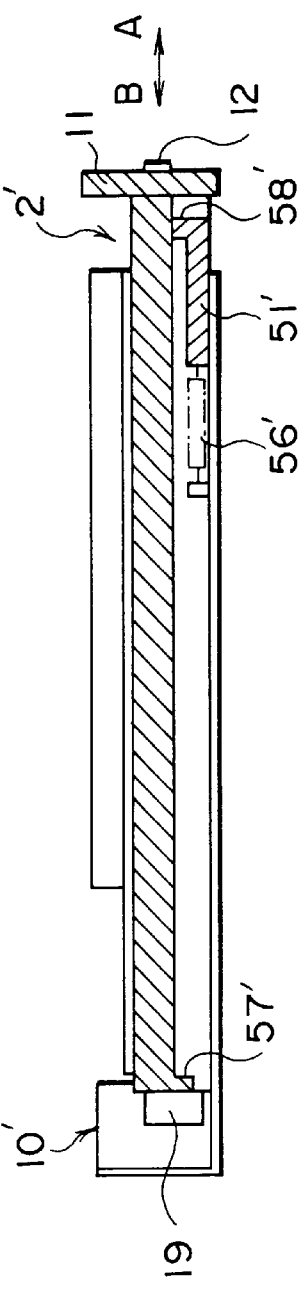
Figure 19C:
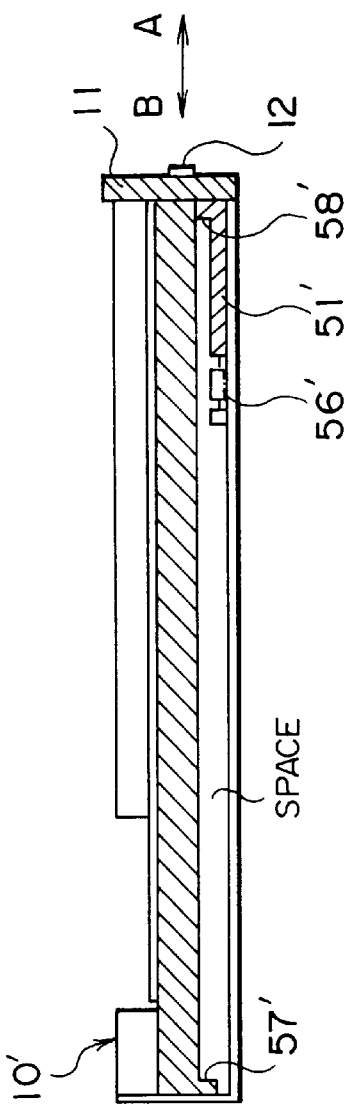

The slide-stopping mechanism 7 may be realized also by another embodiment. FIG. 19A to FIG. 19C show illustrations for explaining an operation of the another embodiment of the slide-stopping mechanism 7. Elements in FIG. 19A to FIG. 19C which are the same as those of FIG. 12A to FIG. 12C are given the same reference numerals. The slide-stopping mechanism 7 shown in FIG. 19A to FIG. 19C is constructed to include a slide-stopping lever 51' (position-restriction member) provided in an end area in the direction A of the chassis 10', a coil spring 56' pressing the slide-stopping lever 51' in the direction A, and a coupling projection 57' provided in an end part in the direction B of the tray 2'. Namely, in different from the slide-stopping mechanism 7 shown in FIG. 12A to FIG. 12B, in which the position-restriction member is provided in a rear side of the tray 2, in this embodiment, the position-restriction member is provided in a front side of the chassis 10'.

In FIG. 19A to FIG. 19C, the slide-stopping lever 51' is provided in a space formed under the tray 2', and is movable in the directions A and B. When the slide-stopping lever 51' moves in the direction A, the slide-stopping lever 51' moves to a first position so as to be projected from the back end of the tray 2' (by a distance L' shown in FIG. 19A), and when the slide-stopping lever 51' moves in the direction B, the slide-stopping lever 51' moves to a second position inside the tray 2'.

On the end part in the direction A of the slide-stopping lever 51', a coupling pawl 58' relationally coupling with the coupling projection 57' formed in the tray 2' is provided.

Next, a description will be given of the operation of the another embodiment of the slide-stopping mechanism 7, by referring to FIG. 19A to FIG. 19C. FIG. 19A shows a condition where the tray 2' is extracted to the disk-exchanging position. In this condition, the coupling pawl 58' formed in the slide-stopping lever 51' engages on the coupling projection 57' formed in the tray 2' and the tray 2' is restricted from moving in the direction A. Further, when the tray 2' is extracted to the disk-exchanging position, the slide-stopping lever 51' moves in the direction A, and, thus, slide-stopping lever 51' is projected from the front-end part of the chassis 10'.

FIG. 19B shows a condition in which the tray 2' is pressed and moved in the direction B. When the tray 2' is further pressed and moved in the direction B as compared to the above condition, the coupling pawl 58' formed in the slide-stopping lever 51' contacts a rear face of the bezel 11 of the tray 2'. This condition is shown in FIG. 19C. In the condition shown in FIG. 19C, the tray 2' is at the disk-driving position, and the tray 2' is locked at the disk-driving position by another locking mechanism.

As will be appreciated from the foregoing description, in this embodiment of the slide-stopping mechanism 7, although the tray 2' needs to have the space for accommodating the slide-stopping lever 51', the extractable distance of the tray 2' in the direction A may be increased by providing the slide-stopping lever 51'. Therefore, also in this embodiment, the disk-exchanging operation for the tray 2' may easily be carried out.

Further, the slide-stopping mechanism 7 in this embodiment has the function of restricting further movement of the tray 2' when the tray 2' moves and arrives at the disk-exchanging position. In addition to this function, the slide-stopping mechanism 7 also has the ejecting function when the lock is released.

Next, a description will be given of the locking mechanism 8, by referring to FIG. 6, and FIG. 13 to FIG. 16. As shown in these drawings, the locking mechanism 8 is provided in the locking-mechanism installing part 3b of the frame 3a of the sub-chassis 3, and is constructed with the solenoid 49, a lock pin 60, a lock lever 61, a emergency lever 62.

The lock pin 60 is provided and stood in the bottom part of the chassis 10. The lock lever 61 is supported in a rotatable manner about an axis by a pin 63 on a back-side face of the frame 3a of the sub-chassis 3. Also, the lock lever 61 is constructed with an arm part 65 having, in the top end, a pawl part 64 which couples with the lock pin 60, and a joint-part arm 67 connecting with a plunger 66 of the solenoid 49, etc. Further, in the top-end part of the pawl part 64, a taper part 68 is formed, and in the arm part 65, a standing pin 69 connecting with an emergency lever 62 is formed.

The solenoid 49, when the switch button 12 of the bezel 11 is turned on, is magnetized, and draws the plunger 66. Since the end part of the plunger 66 connects with the joint-part arm 67 of the lock lever 61, the lock lever 61 rotates about the axis 63 of pin with the operation of the plunger 66. The plunger 66 is pressed in an extending direction by a coil spring 70a provided in the solenoid 49.

In the following, an operation of the locking mechanism 8 will be discussed. As discussed above by referring to FIG. 12A to FIG. 12C, etc., when the tray 2 is controlled to move to the disk-driving position in the direction A, the sub-chassis 3 also moves on the chassis 10 in the direction A. As a result, the lock lever 61 engages with the lock pin 60.

Then, when the tray 2 arrives at the disk-driving position, the taper part 68 of the lock lever 61 moves over the lock pin 60, and the pawl part 64 is coupled with the lock pin 60. Therefore, the movement of the sub-chassis 3 is locked by the locking mechanism 8, and the tray 2 provided in the sub-chassis 3 is also locked. FIG. 14 shows this locking condition.

Figure 15:
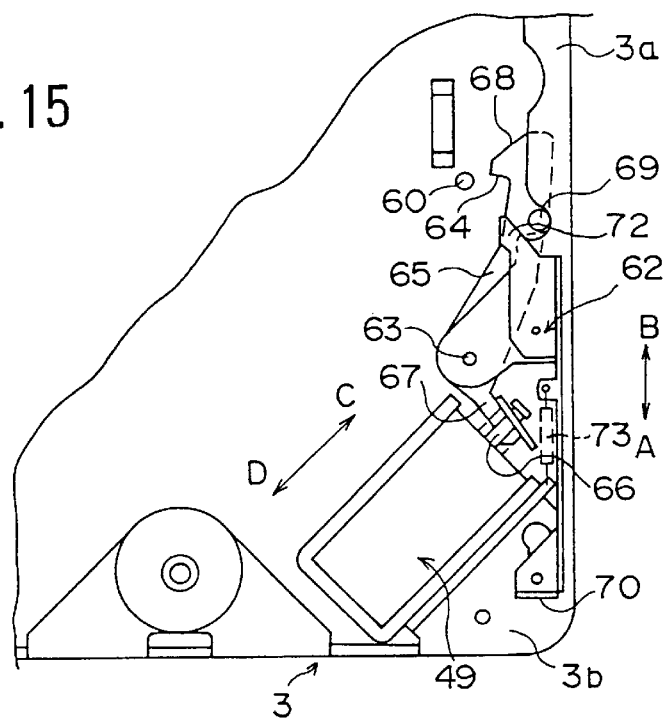
FIG. 15 shows an illustration for explaining an operation of the locking mechanism.

On the other hand, when the switch button 12 is turned on and the plunger 66 is withdrawn, the lock lever 61 rotates in a direction so that the pawl part 64 is spaced apart from the lock pin 60, and, thus, the connection between the pawl part 64 and the lock pin 60 is released. Accordingly, the locking of the sub-chassis 3 by the locking mechanism 8 is released, and the tray 2 is in a movable condition (a lock-release condition) as shown in FIG. 15.

The emergency lever 62 is provided in the frame 3a of the sub-chassis 3 so that the lever is movable in the directions A and B. In the end part in the direction A of the emergency lever 62, a contact part 70 is formed so as to be facing a needle-insertion hole 71 (shown in FIG. 17) formed in the front-face bezel 11. Further, in the end part in the direction B of the emergency lever 62, an operation pawl 72 having a taper shape is formed so as to be facing the standing pin 69 standing on the lock lever 61. Also, the emergency lever 62 is pressed in the direction A by a coil spring 73.

The above-discussed emergency lever 62 is provided because even if the power supply of the computer providing with the driving apparatus 1 is cut off (namely, even if the solenoid 49 can not be driven), the lock of the tray 2 by the locking mechanism 8 can be released to extract the tray 2.

Figure 16:
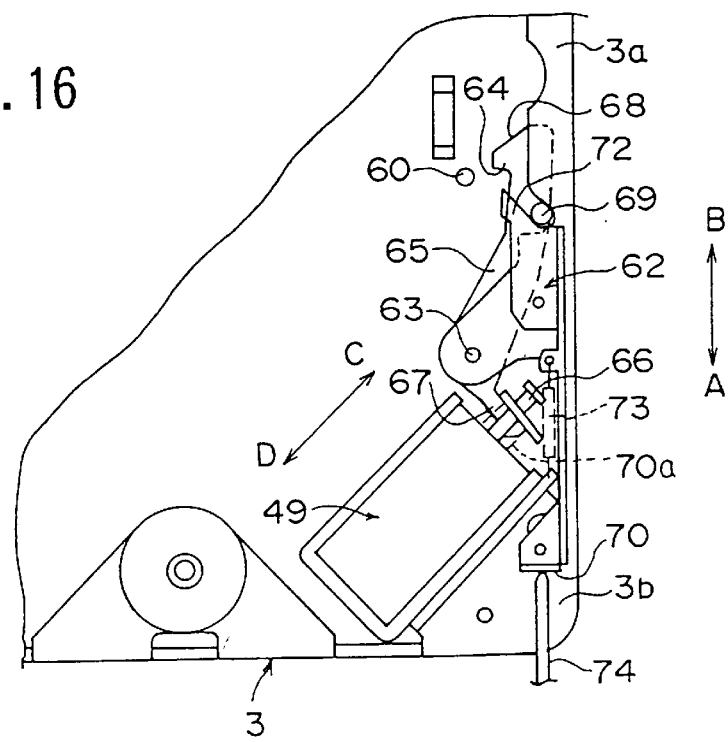
FIG. 16 shows an illustration for explaining an operation of an emergency lever.

In further detail, when the driving apparatus 1 is in the condition in which the solenoid 49 can not be driven, a needle 74 is inserted into the needle-insertion hole 71 in the direction B as shown in FIG. 16. The needle 74 contacts the contact part 70, and presses the emergency lever 62 in the direction B. When the emergency lever 62 moves in the direction B by the pressing force of the needle 74, the operation pawl 72 couples with the standing pin 69 provided in the lock lever 61 and presses the pin 69.

Since the operation pawl 72 has the taper shape as discussed above, when the operation pawl 72 operates in the direction B, the lock lever 61 also rotates, and, soon, the connection between the pawl part 64 and the lock pin 60 is released. Therefore, even if the driving apparatus 1 is in a condition in which the solenoid 49 can not be driven, the tray 2 may easily be extracted.

In the following, positioning of the solenoid 49 will be discussed. The solenoid 49 is constructed so that driving directions (represented by directions C and D in the drawings) of the plunger 66 (driving axis) are angled from the moving directions (represented by the directions A and B) of the tray 2. In further detail, in the case of this embodiment, the driving directions of the plunger 66 is angled by 45 degrees from the moving directions of the tray 2.

As discussed above, the lock of the locking mechanism 8 is released by the plunger 66 moving in the direction D. Since the driving apparatus 1 including the locking mechanism 8 is provided in the note-type personal computer, the driving apparatus 1 may be given a shock when transporting the computer. When a direction of the shock is identical to the driving direction of the plunger 66, the plunger 66 may move, and, thus, the lock of the tray 2 may be released. As a result, the tray 2 may be released and be ejected out of the chassis 10.

Therefore, the inventors analyzed the directions of shocks given to the driving apparatus 1 which provided in a note-type personal computer. As a result of the analysis, it was found that the shocks given to the driving apparatus 1 mainly have the directions A, B, and directions E, F. Therefore, in this embodiment, because the driving directions of the plunger 66 are angled from the moving directions (directions A and B) of the tray 2, the driving directions of the plunger 66 may be different from the directions in which the shock is easily applied. Therefore, even if a shock is applied to the driving apparatus 1, the locking condition of the tray 2 may be positively held.

Further, since the driving directions of the plunger 66 are angled from the moving directions of the tray 2, the solenoid 49 may be positioned substantially parallel to the above-discussed pick-up driving motor 25. Therefore, the solenoid 49 and the pick-up driving motor 25 may be positioned adjacent to each other. Accordingly, the driving apparatus 1 may be miniaturized as compared to the prior-art apparatus in which the solenoid 49 and the pick-up driving motor 25 are spaced apart from each other on a diagonal line of the sub-chassis 3 while sandwiching the pick-up part 5 therebetween.

Figure 17:
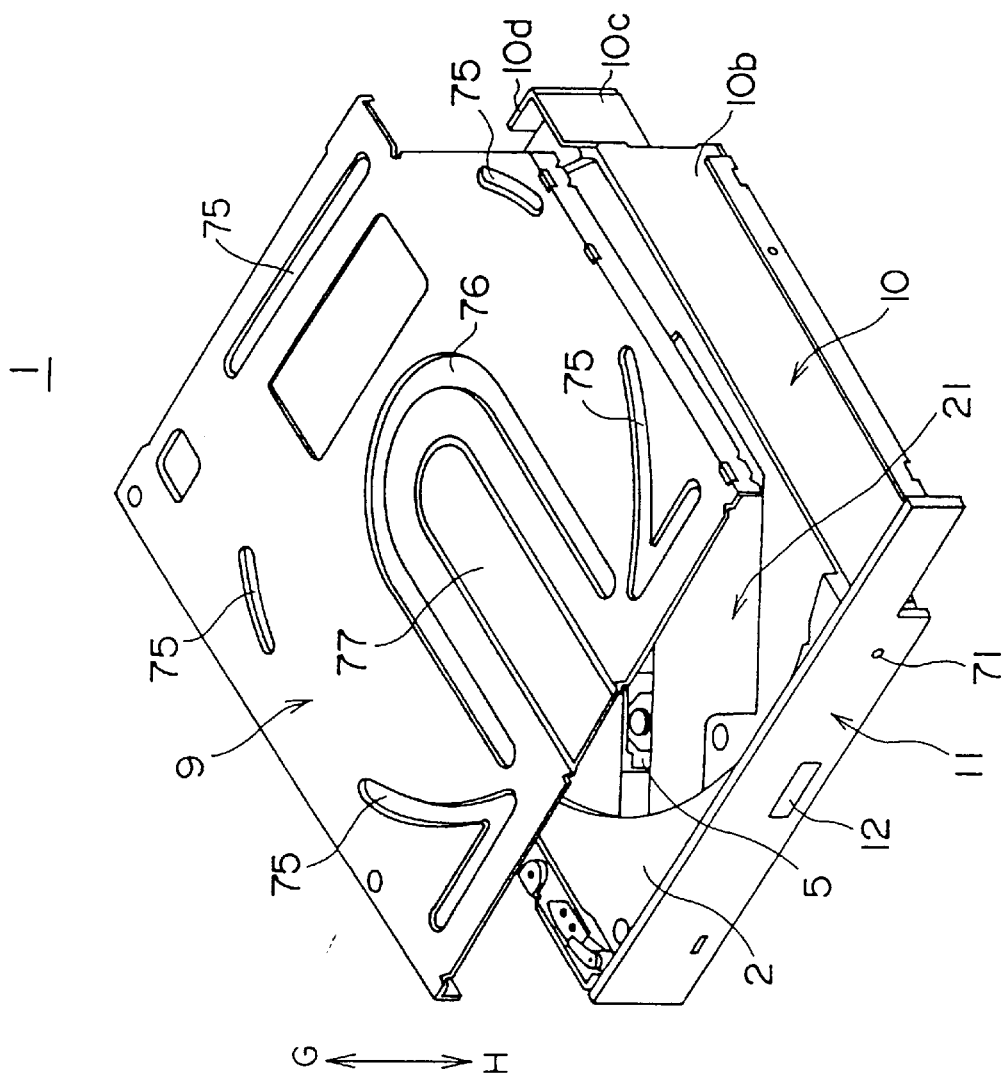
FIG. 17 shows a perspective view for explaining a projection part formed in a cover.

Next, a description will be given of the cover 9, by referring to FIG. 17, FIG. 18A and FIG. 18B.

The cover 9 is provided over the chassis 10 and has a function of protecting a variety of mechanisms and apparatuses provided in the chassis 10. The cover 9 is formed by pressing and shaping a steel plate. The cover 9 is designed to be thin so that the driving apparatus 1 will be thinner. Therefore, to obtain a given strength for the cover 9 even if the cover thickness is decreased, projection parts 75, 76 projecting in an inner direction (namely, toward the disk positioned at the disk-driving position) are formed, and a projection part 77 projecting in an upper direction is formed.

The projection parts 75, 76, 77 may easily be formed by the press-shaping process at the same time when forming the cover 9. Further, for example, for the projection parts 75, 76, 77, projection lengths of about 0.6 mm, 0.4 mm, 0.15 mm are respectively set.

As shown in FIG. 18A, in this embodiment, the projection part 75 of the above-discussed projection parts 75, 76, 77 is provided so as to face a peripheral position of a disk 78 positioned at the disk-driving position.

In the above structure, even if a shock is applied to the driving apparatus 1 in upper and lower directions (represented by directions G and H in the drawing) and the disk 78 is bent and changed in shape (warped) as shown in FIG. 18B, the disk 78 may contact only the projection part 75 formed in the cover 9. A contact area of the disk 78 and the projection part 75 is designed to be approximately 1 mm width in the radial direction of the disk.

In general, the disk 78 provided in the CD-ROM apparatus has a back-face side as a recording side and a surface side where a variety of printed material is displayed. Therefore, when a shock in the upper and lower directions is applied to the driving apparatus 1, and when the contact area of the disk 78 and the cover 9 is relatively wide, the printed material on the disk 78 may be scraped, and, thus, identification of the disk 78 may be difficult.

On the contrary, in this embodiment, the contact area of the disk 78 and the cover 9 when a shock is applied is restricted to the area of the projection part 75, and the contact area is relatively narrow, and further, the contact area is positioned at the peripheral position of the disk 78 where no printed material is commonly provided. Therefore, the printed material on the disk 78 is prevented from being scraped, and the identification of the disk 78 may positively be performed.

Furthermore, the disk 78 has a reflection face for reflecting a laser light, and has a structure in which plastic layers are formed on both sides of the reflection face to protect the reflection face. Since the plastic layer in the surface side of the disk 78 has only a 30-μm thickness, if the disk 78 and the cover 9 contact each other in the wide area when a shock in the upper and lower direction is applied as discussed above, the plastic layer in the surface side of the disk 78 is scraped, and, thus, the reflection face may be scratched or damaged. As a result, data stored in the disk 78 may also be lost or damaged.

On the contrary, in this embodiment, the contact area of the disk 78 and the cover 9 when a shock is applied is only on an approximately 1-μmm width part of the peripheral position of the disk 78. Further, in the CD-ROM, a 2-μmm wide peripheral area of the disk is defined as a non-recording area. Therefore, the data stored in the disk 78 is prevented from being lost or damaged, and, thus, the data stored in the disk 78 may be positively reproduced.

The present invention is not limited to the CD-ROM driving apparatus shown in the above-discussed embodiment, but is applicable to a CD, a magnetic disk, an optical magnetic disk, and a optical disk.

Further, the disk unit according to the present invention has been discussed with respect to one configuration example in that the disk unit is provided within the housing of the note-type personal computer. The disk unit according to the present invention is not limited to the above configuration example, but also is applicable to any electrical apparatus and any external apparatus provided as a different body from the electrical apparatus.

Further, the present invention is not limited to these embodiments, but other variations and modifications may be made without departing from the scope of the present invention.

What is claimed is:

1. A disk unit comprising:

a chassis provided with an opening through which a manually movable tray is inserted for holding a disk and having an engaging part in the neighborhood of said opening; with said tray being movable between a disk-driving position inside said chassis and a disk-exchanging position outside said chassis;

a tray sliding mechanism having guide rails disposed on opposite sides of said chassis to permit the tray to be manually moved on said guide rails between said disk-driving position inside said chassis and said disk-exchanging position outside said chassis; and a slide-stopping member slidably coupled to said tray sliding mechanism to permit said tray to be manually extended a predetermined distance from the end thereof into said disk-exchanging position outside the chassis said slide stopping member provided with a contact part engageable with said engaging part of said chassis when said tray is moved to the disk-exchanging position so as to restrict further movement of said tray beyond the disk-exchanging position and with said disk unit having urging means for urging the slide stopping member when said tray is in the disk-driving position to cause movement of said tray out from said disk-driving position a distance no greater than said predetermined distance so as to permit the tray to be manually withdrawn from inside said chassis, wherein said slide-stopping member slidably moves relative to said tray sliding mechanism to permit a dual function of said slide-stopping member to maintain the tray to outside said chassis at the disk exchanging position and to enable said tray to be manually withdrawn from said disk-driving position.

2. The disk unit of claim 1, wherein said disk unit further comprises:

a tray locking mechanism having a lock for locking said tray at the disk driving position and means for releasing said tray from said lock, said slide-stopping member having a contact part being urged by said urging means to move to a position projecting from said chassis, when said tray at the disk-driving position is released from said lock by said tray locking mechanism, thereby allowing a user of said disk unit to move said tray to the disk exchanging position.

3. A disc unit comprising:

a chassis provided with an opening through which a tray holding a disc is inserted and provided with an engaging part in the neighborhood of said opening, said tray movable between a disk-driving position inside said chassis and a disc-exchanging position outside said chassis;

a guide rail provided on each side of said chassis so as to movably support said tray between the disk-driving position and the disc-exchanging position;

a slide-stopping member movably provided on said tray, said slide-stopping member provided with a contacting part to be engaged with an engaging part of said chassis when said tray moves to the disk-exchanging position so that said tray is restricted from moving beyond the disk-exchanging position, said slide-stopping member being movable so that said contacting part is movable to a position beyond an end of said tray on a side of the disk-driving position in a direction toward the disk-driving position, wherein when said tray moves toward the disk exchanging position, said slide-stopping member moves in the direction toward the disk-driving position and, thereby, said contacting part of said slide-stopping member is engaged with said engaging part of said chassis in a state in which said contacting member protrudes from the end of said tray on the side of said disk-driving position in the direction toward the disk driving position; and the end of said tray on the side of the disk driving position moves further from said engaging part of said chassis in a direction toward the disc exchanging position, thereby said slide-stopping member moves said tray at the disk-exchanging position to a position further outside said chassis.

4. The disc unit as claimed in claim 3, further comprising urging means for urging said slide-stopping member in the direction toward the disk exchanging position.

5. The disc unit as claimed in claim 3, further comprising urging means for urging said slide-stopping member in the direction toward the disk-driving position.

6. The disc unit as claimed in claim 5, wherein said tray is manually movable between the disk-driving position and the disk exchanging position, said slide-stopping member being urged by said urging means to move said tray at the disk-driving position outwardly by a predetermined distance so as to facilitate a manual operation to move said tray out of said chassis, thereby said slide-stopping member provides a function to move said tray at the disc exchanging position outwardly from said chassis and a function to facilitate the manual operation to move said tray from the disk-driving position.

7. The disc unit as claimed in claim 5, wherein said tray is manually movable between the disk-driving position and the disk exchanging position, said slide-stopping member being urged by said urging means to move said tray at the disk-driving position outwardly by a predetermined distance so as to facilitate a manual operation to move said tray out of said chassis, thereby said slide-stopping member provides a function to move said tray at the disc-exchanging position outwardly from said chassis and a function to facilitate the manual operation to move said tray from the disk-driving position.

8. A disc unit comprising:

a chassis provided with an opening;

a tray holding a disc, said tray being inserted through said opening of said chassis and movable between a disk-driving position inside said chassis and a disc-exchanging position outside said chassis, said tray provided with an engaging part in the neighborhood of an end of said tray on a side of the disc-driving position;

a guide rail provided on each side of said chassis so as to movably support said tray between the disk-driving position and the disc-exchanging position;

a slide-stopping member movably provided on said chassis, said slide-stopping member provided with a contacting part to be engaged with an engaging part of said tray when said tray moves to the disk-exchanging position so that said tray is restricted from moving beyond the disk-exchanging position, said slide-stopping member being movable so that said contacting part is movable to a position beyond an end of said chassis on the side of the disk-exchanging position in a direction toward the disk-exchanging position, wherein when said tray moves toward the disk exchanging position, said slide-stopping member moves in the direction toward the disk-exchanging position and, thereby, said contacting part of said slide-stopping member is engaged with said engaging part of said tray in a state in which said contacting part protrudes from the end of chassis on a side of the disk-exchanging position in the direction toward the disc-exchanging position, and the end of said tray on the side of the disk-driving position moves further from the end of said chassis on the side of the disk-exchanging position in a direction toward the disc-exchanging position, thereby said slide-stopping member moves said tray at the disk exchanging position to a position further outside said chassis.

* * * * *